(12) United States Patent
Gruner (10) Patent No.: US 8,366,114 B1
(45) Date of Patent: Feb. 5, 2013

(54) STUFFING BOX COOLING SYSTEM

(76) Inventor: Daron M. Gruner, Casper, WY (US)

( * ) Notice: Subject to any disclaimer, the term of this patent is extended or adjusted under 35 U.S.C. 154(b) by 316 days.

(21) Appl. No.: 12/813,446

(22) Filed: Jun. 10, 2010

Related U.S. Application Data (60) Provisional application No. 61/185,935, filed on Jun. 10, 2009.

(51) Int. Cl.
*E21B 33/03* (2006.01)
*F16J 15/26* (2006.01)

(52) U.S. Cl. ........ 277/329; 277/336; 277/510; 277/515; 277/930

(58) Field of Classification Search .................. 277/329, 277/336, 510–512, 515, 930
See application file for complete search history.

(56) References Cited

U.S. PATENT DOCUMENTS

| | | | |
|---|---|---|---|
| 3,147,982 A * | 9/1964 | Klein | 277/515 |
| 3,845,909 A | 11/1974 | Johansson | |
| 4,194,746 A | 3/1980 | Stevens | |
| 4,229,011 A * | 10/1980 | Wikelski et al. | 277/432 |
| 4,613,140 A | 9/1986 | Knox | |
| 4,818,192 A | 4/1989 | Korthaus | |
| 5,125,792 A | 6/1992 | Korenblit | |
| 5,823,541 A | 10/1998 | Dietle et al. | |
| 5,873,575 A * | 2/1999 | Hanlon | 277/512 |
| 6,478,303 B1 * | 11/2002 | Radcliffe | 277/329 |
| 6,932,351 B1 * | 8/2005 | Mowll | 277/512 |
| 7,114,726 B2 | 10/2006 | Murray | |
| 7,152,660 B2 | 12/2006 | Bergmans et al. | |
| 2009/0194951 A1 | 8/2009 | Cohen Zada Vaizman | |

FOREIGN PATENT DOCUMENTS

WO 84/03914 10/1984

OTHER PUBLICATIONS

"Vortex Cooled Packing Cases," 2008 Cook Compression. Vortex is a mark of Dover Corporation. Patent No. 5,873,575.

* cited by examiner

*Primary Examiner* — Vishal Patel
(74) *Attorney, Agent, or Firm* — Samuel M. Freund; Cochran Freund & Young LLC (57) ABSTRACT

A system for cooling packing material utilized for sealing a shaft moving therethrough is described. The packing material held in place by at least one packing cup, wherein a coolant is directed axially through a significant volume of each packing cup close to the packing material. The present system finds use for compressors and pumps where pressure requirements of the fluids acted upon demand the use of packing materials in close contact with the moving shafts.

10 Claims, 10 Drawing Sheets

STUFFING BOX COOLING SYSTEM

RELATED CASES

The present patent application claims the benefit of Provisional Patent Application Ser. No. 61/185,935 filed on Jun. 10, 2009 entitled "Packing Box Cooling System" by Daron Mark Gruner, which application is hereby incorporated by reference herein for all that it discloses and teaches.

FIELD OF THE INVENTION

The present invention relates generally to stuffing or packing boxes and, more particularly, to an apparatus for cooling the packing material in stuffing boxes.

BACKGROUND OF THE INVENTION

Packing boxes are used in many commercial, industrial and consumer applications to provide a conformable sealing member around a movable shaft or stem inserted through a cylindrically shaped cavity of larger diameter, generally called a stuffing box. In compressor applications, a compressive load is typically created by pressure (that is intended to be contained) and produces a combination of a radial force that forces the inner diameter of the packing to conform to the outer diameter of the movable shaft or stem, and an axial force that forces the face of the packing facing away from the pressure against one of the interior faces of the packing box or packing cups, so as to form a seal between the packing, packing box, and the movable shaft.

Since the function of the packing material is to form a pressure seal around a movable rod, an undesired result of the contact between the movable rod and the packing material is friction, which produces heat. The greater the pressure being sealed by the packing, the greater the friction and the resulting heat production becomes. In extreme cases, the heat produced can melt or damage the packing.

Common causes of packing failure in equipment such as valve packing boxes, pumps, compressors, probes, and the like may include improper loading, over or under tightening of packing cups, and misalignment of the shaft or stem. Too much compression may lead to excessive friction and premature wear, while too little compression can lead to premature leakage. Shaft or stem misalignment can generate these problems as well. Packing integrity can change by over-pressuring, surging, flashing, excessive temperature, and combinations thereof by the material flowing through the valve packing box. Such occurrences may cause over-compression of the packing inside the stuffing box, thereby creating a leakage path even when springs are used to maintain compression. Changes in packing compression may also cause control valve packing boxes to stick and slip, resulting in unbalancing process control. Pumps, compressors, probes, mixers, and the like, can also suffer from initial improper packing integrity and changes over time, which may result in unwanted emissions, safety problems, maintenance downtime, and loss of production.

Many packing boxes that are designed to work in extreme pressure environments use various liquid coolants flowed through cooling jackets external to the packing cups for cooling the exterior of the packing cups. However, significant cooling is not provided to the packing material within the packing cups since, although these jackets permit significant coolant flow, the considerable distance from the packing in the box to the coolant does not allow efficient heat transfer from the packing itself; thus, while the outside of the boxes are well cooled, the packing material itself may not be. This uneven cooling or lack of cooling can cause the packing material within the packing cups to degrade and melt.

Additionally, cooling methods in commercial packing boxes utilize tangential coolant channels for permitting coolant to circulate through a packing cup prior to passing into the next packing cup. Since the packing cups are cooled serially, the coolant must travel through a lengthy path which increases the pressure drop in the coolant across the packing box, thereby reducing the flow rate of coolant and its resulting cooling efficiency. That is, the small amount of coolant that travels through the packing box may become heated in the first few packing cups to the point that it does not provide cooling to subsequent cups. High-pressure coolant pumps may be used to force the coolant through the packing box, which may be undesirable in some situations due to cost, weight, size, and increased parts and maintenance requirements of such pumps.

Degradation and melting of the packing material within the packing cups can lead to overheating of the packing box due to the high level of friction and heat that is generated by the rod movement. This overheating can cause significant damage not only to the packing box, but to the rod and piston assembly of a compressor including binding of the rod or the piston assembly. Similar damage may occur for pumps using a rotating impeller, as an example. Resulting mechanical problems within the compressor unit, and the potential for bodily injury to individuals working in the area around the compressor unit are of concern.

SUMMARY OF THE INVENTION

Accordingly, it is an object of embodiments of the present invention to provide an apparatus for cooling the packing material in a packing or stuffing box.

Another aspect of embodiments of the invention is to provide an apparatus for cooling packing material in a stuffing box, and for preventing the escape of fluids passing through the packing material along a shaft moving therethough.

Yet another aspect of embodiments of the invention is to provide an apparatus for cooling packing material in a stuffing box, and for lubricating the shaft as it moves therethrough.

Still another aspect of embodiments of the invention is to provide an apparatus for cooling packing material in a stuffing box, and for reducing pressure experienced by the packing material.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects, and in accordance with the purposes of the present invention, as embodied and broadly described herein, the apparatus for cooling reciprocating shaft packing material, hereof, includes: an end flange having a cylindrical bore having a first diameter and defining an axis, a first circular counterbore through a first surface having a second diameter larger than first diameter and centered on the axis forming an interior flat surface, and at least two first initially radial coolant ports opening to a lateral surface of the flange between the first surface and a second surface at one end and opening to the interior surface at a second end; at least one cylindrical packing cup having an outer diameter adapted to insert into the first counterbore of the flange, and having a first flat surface and a second flat surface parallel thereto, a cylindrical bore therethrough having a diameter equal to the first diameter and centered on the axis, a circular counterbore through the first surface having a diameter equal to the second diameter and centered on the axis, forming thereby an interior flat surface, a first groove in the first side disposed outside of the second diameter, a second groove in the first side disposed outside of the second diameter and not intersecting the first groove, at least two axial coolant ports at least one of which is in fluid contact with the first groove at one end and opens into the second surface at the other end, and at least one of the at least two coolant ports is in fluid contact with the second groove at one end and opens into the second surface at the other end, at least one of the at least two cooling ports of the end flange being in fluid communication with the first groove, and at least one of the at least two cooling ports being in fluid communication with the second groove; a coolant return cup having first flat surface and a second flat surface parallel thereto, a cylindrical bore therethrough having a diameter equal to the first diameter and centered on the axis, a circular counterbore through the first surface having a diameter equal to the second diameter and centered on the axis forming thereby an interior flat surface, a groove in the first side disposed outside of the second diameter, the at least two coolant ports opening to the second side of the at least one packing cup being in fluid communication with the groove; a shaft adapted to slidably move within the bores of the flange, the at least one packing cup, and the coolant return cup; packing material disposed within the circular counterbore of said at least one packing cup and the circular counterbore of said coolant return cup; and means for moving coolant fluid through the cooling ports of the flange, the at least one packing cup, and the coolant return cup.

In another aspect of the invention, and in accordance with its objects and purposes, the apparatus for cooling reciprocating shaft packing material, hereof, includes: at least one packing cup having first flat surface and a second flat surface parallel thereto, a cylindrical bore having a first diameter and defining an axis, a circular counterbore through the first surface having a diameter larger than the first diameter and centered on the axis, forming an interior flat surface, a first groove in the first surface disposed outside of the second diameter, a second groove in the first side having disposed outside of second diameter and not intersecting the first groove, at least two axial coolant ports at least one of which is in fluid communication with the first groove at one end and opening into the second surface at the other end, and at least one of the at least two coolant ports in fluid connection with the second groove at one end and opening to the second surface at the other end; a coolant return cup having first flat surface and a second flat surface parallel thereto, a cylindrical bore having a diameter equal to the first diameter and centered on the axis, a circular counterbore through the first surface having a diameter equal to the second diameter and centered on the axis forming an interior flat surface, a groove in the first side disposed outside of the second diameter, the at least two coolant ports exiting the second side of the at least one packing cup being in fluid communication with the groove; means for supplying chilled coolant to the at least one first groove; a shaft adapted to slidably move within the bores of the at least one packing cup and the coolant return cup; and packing material disposed within the circular counterbore of the at least one packing cup and the circular counterbore of the coolant return cup.

In yet another aspect of the invention, and in accordance with its objects and purposes, the apparatus for cooling rotating shaft packing material, hereof includes: an end flange having: a cylindrical bore having a first diameter and defining an axis connecting a first surface and a second surface, a circular counterbore through the first surface having a second diameter and centered on the axis forming thereby an interior flat surface, and at least two first initially radial coolant ports opening to a lateral surface of the flange between the first surface and the second surface at one end and opening into the first interior surface at a second end; at least one packing cup having first flat surface and a second flat surface parallel thereto, a cylindrical bore having a diameter equal to the first diameter and centered on the axis, a circular counterbore through the first surface having a diameter equal to the second diameter and centered on the axis forming an interior flat surface, a first groove in the first surface disposed outside of the second diameter, a second groove in the first surface disposed outside of the second diameter and not intersecting the first groove, at least two axial coolant ports at least one of which is in fluid connection with the first groove at one end and opens into the second surface at the other end, and at least one of the at least two coolant ports is in fluid connection with the second groove at one end and opens into the second surface at the other end, at least one of the at least two cooling ports of said end flange being in fluid communication with the first groove, and at least one of the at least two cooling ports being in fluid communication with the second groove; a coolant return cup having first flat surface and a second flat surface parallel thereto, a cylindrical bore having a diameter equal to the first diameter and centered on the axis, a circular counterbore through the first surface having a diameter equal to the second diameter and centered on the axis forming an interior flat surface, a groove in the first surface disposed outside of the second diameter, the at least two coolant ports exiting the second surface of the at least one packing cup being in fluid communication with the groove; a shaft adapted to rotatably move within the bores of the flange, the at least one packing cup, and the coolant return cup; packing material disposed within the circular counterbore of the at least one packing cup and the circular counterbore of said coolant return cup; and means for moving coolant fluid through the cooling ports of the flange, the at least one packing cup, and the coolant return cup.

Benefits and advantages of the present invention include, but are not limited to, providing an apparatus for efficiently cooling packing material in stuffing boxes by axial coolant flow, wherein the coolant passes twice through a substantial volume of each packing cup close to the packing material.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings:

FIG. 1A is a schematic representation of a cross sectional view of an assembled stuffing box showing the end flange, the vent disk, packing cups, the coolant return cup, the pressure breaker cup, the collar, the packing material, the coolant pump, the lubrication pump, and coolant refrigerator, the vented fluid collector, and one of the alignment rods, while

FIG. 2A is a schematic representation of the top view of a vent disk for directing fluids (gases and/or liquids) having passed through intervening packing material safely out of the stuffing box to where they may be collected, if required, illustrating circular, non-intersecting coolant grooves therein including coolant ports passing through the disk, for receiving coolant from the axial coolant port of the end flange, while

FIG. 3A is a schematic representation of the top view of a packing cup, illustrating circular, non-intersecting coolant grooves therein including coolant ports passing through the cup for receiving coolant from coolant ports from an adjacent packing cup or from an adjacent vent disk, and a counterbore for holding packing material, while

FIG. 4A is a schematic representation of the top view of a coolant return cup, illustrating a circular groove for receiving coolant from inlet ports from an adjacent packing cup as shown in FIG. 3A, and returning the coolant to coolant outlet ports therein, while

FIG. 5A is a schematic representation of the top view of a pressure breaker cup for reducing pressure on packing material behind it, while

FIG. 6A is a schematic representation of the top view of a collar for sealing the stuffing box members to a cooperating device, such as a compressor cylinder, for aligning the bores of the members to the shaft emerging from the device, and for guiding a moving shaft using an inserted bushing, while

DETAILED DESCRIPTION OF THE INVENTION

Briefly, the present invention includes a system for cooling packing materials in a stuffing box having a movable rod contacting packing material held in place by at least one packing cup, wherein a coolant flows axially through a significant volume of each packing cup. The coolant may be selected from liquids used for cooling, including water, any mixture of water with chemicals used as anti-freeze, oil, and liquid refrigerants, and air, nitrogen, $CO_2$ (liquid or gas), and any gases used for cooling purposes.

In situations where shaft lubrication ports are not strictly required, the stuffing box of the present invention is advantageous since the lack of lubrication produces more heat, and the present cooling apparatus helps mitigate this problem.

The term, "packing cup" as used herein, means a device that holds packing material in place inside the stuffing box, while packing material means material that is held in place by a packing cup and used to prevent the build-up of gases created through movement of a shaft passing through the packing material performing some function in an attached device such as a compressor, as an example, from being released from the compressor unit.

The term "packing box" as used herein, is interchangeable with the term "stuffing box" as used herein, and is a device that seals the pressure around a compressor rod (to which a compressor piston is attached) in a compressor cylinder while letting the compressor rod move in and out of the cylinder, or around a rotating rod which may drive a pump impeller, as an example. The packing box may include packing cups, the assembly of packing cups and associated supporting cups, being termed a stuffing box. Packing materials may include many materials in many forms and are available from a variety of sources.

Materials of the stuffing box parts and the packing may include, but are not limited to, steel (any grade), cast iron, stainless steel (any grade), bronze, brass, copper, ceramic (any type), plastic or plastic blends or other materials having strength and corrosion-resistant properties, and thermal conductivity properties effective for such applications.

A port is a hole or bore that extends through parts of the stuffing box for permitting the flow of fluids and gases, while a vent is a port extending through the stuffing box for permitting controlled release of excess gases from the stuffing box.

Figure 1A:
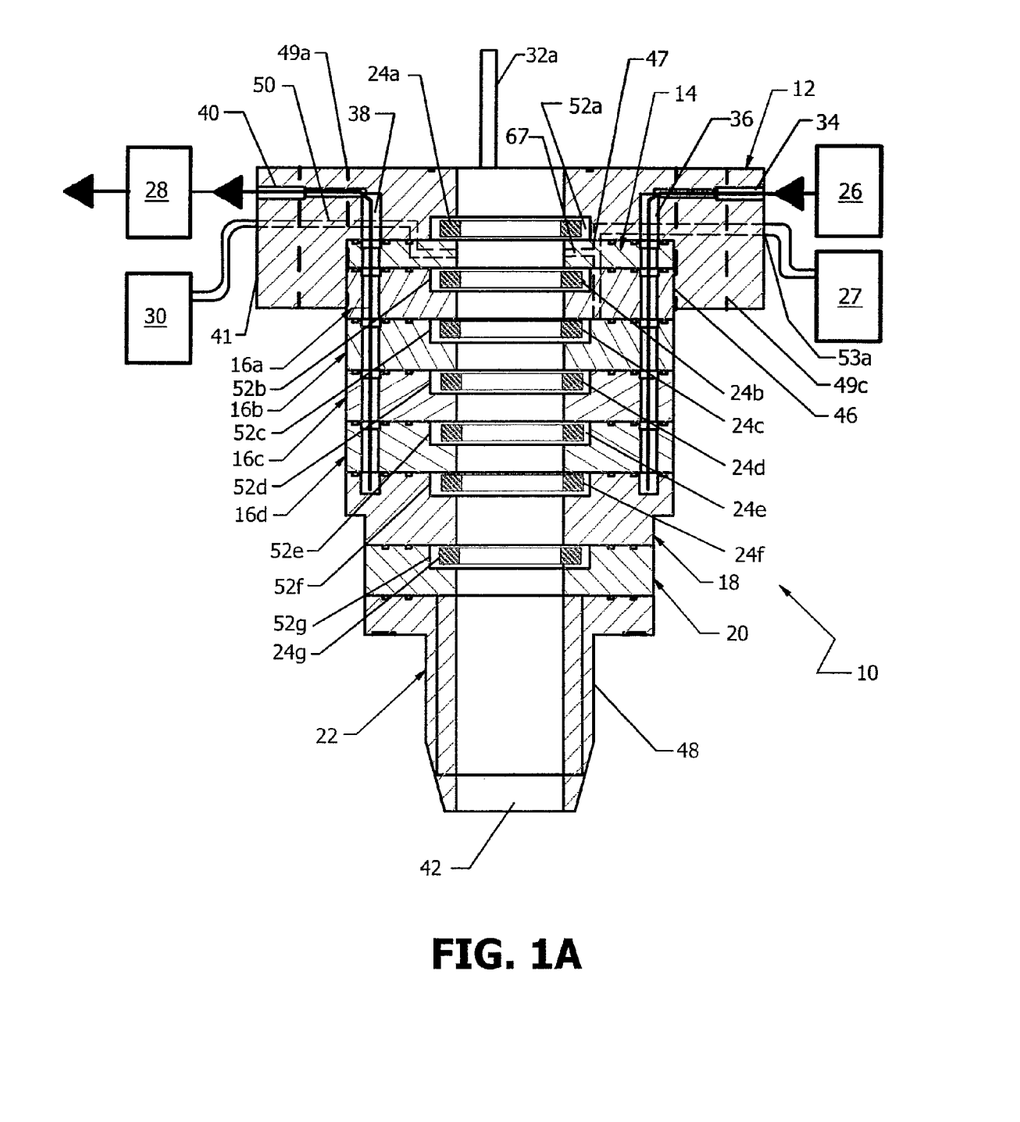
Figure 1B:
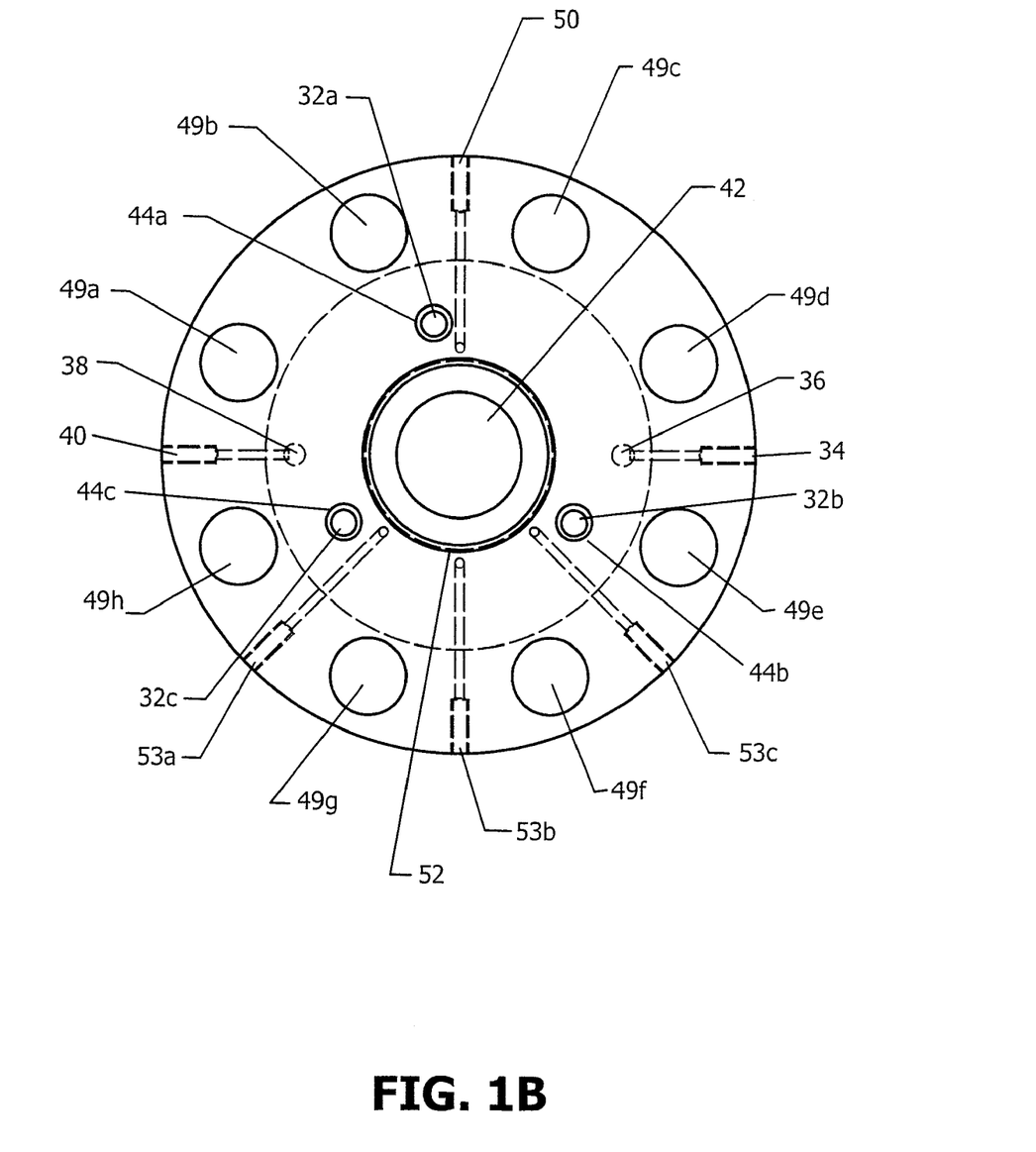
FIG. 1B is a schematic representation of the top view of the stuffing box shown in FIG. 1A.

Reference will now be made in detail to the present embodiments of the invention, examples of which are illustrated in the accompanying drawings. In the FIGURES, similar structure will be identified using identical reference characters. Turning now to FIG. 1A, a schematic representation of a cross sectional view of assembled stuffing box, 10, showing end flange, 12, vent disk, 14, cylindrical packing cups, 16a-16d, cylindrical coolant return cup, 18, cylindrical pressure breaker cup, 20, cylindrical collar, 22, packing material, 24a-24g, coolant pump, 26, lubrication pump, 27, optional coolant refrigerator, 28, vented fluid collector, 30, and one alignment rod, 32a, while FIG. 1B is a schematic representation of the top view of stuffing box 10 shown in FIG. 1A.

Flange 12, which may be circular, although other shapes are possible, holds and aligns the components of the stuffing box for sealing a movable rod or shaft (not shown in FIG. 1A) and, as will be illustrated hereinbelow, permits attachment of the stuffing box to an apparatus which utilizes the motion of the shaft, such as a compressor. As will be described in more detail hereinbelow, coolant pump 26 directs coolant into port, 34, which may enter flange 12, along a radius thereof, then turns in an axial direction, 36, for directing coolant in turn into vent cup 14 and in turn into packing cups 16a-16d and return cup 18. Coolant is returned from return cup 18 and in turn packing cups 16d-16a to vent cup 14 and into flange 12 through axial port, 38, which turns, and may exit, 40, flange 12 radially through lateral surface, 41, thereof. Lubrication pump 27 provides lubrication at various locations, as will be discussed hereinbelow. Optional coolant refrigerator, 28, may be provided for chilling the coolant. As described, the coolant system is a closed loop system utilizing a pump as the means for circulating coolant therethrough. However, an external source of coolant having sufficient pressure to force the coolant through the coolant ports and grooves is also envisioned. An open system, such as an external water supply from a tower or a faucet may also be used, the returning water being discarded.

Alignment of the other members of the stuffing box with end flange 12 and collar 22, as well as alignment of shaft bore, 42, which passes through all of the members, in which the shaft (not shown in FIGS. 1A and 1B) moves may be achieved using alignment rods, 32a-32c, in alignment holes, 44a-44c, which pass through each of the members. In one embodiment, alignment rods 32a-32c may include threaded rod screwed into receiving holes in the upper surface (callout 126 in FIG. 6B) of the collar onto which the remaining members are placed using the alignment holes therein. Further, counterbore, 46, formed a chosen distance into end flange 12, and having flat interior surface, 47, is adapted to receive and align cylindrical vent cup 14 and at least one of the cylindrical packing cups 16, depending on the axial dimensions thereof. Cylindrical collar 22 may have an elongated portion, 48, which is used to assist in the alignment of fastening bolt holes 49a-49h, with holes in a cooperating apparatus. Generally, this elongated portion is cylindrical, but other shapes may be envisioned.

Vented fluid collector 30 may collect fluids, if necessary, and evacuate port, 50, in end flange 12 from fluids (gas or liquid) in shaft bore 42 which have traveled passed packing 24b-24d as a result of the movement of the shaft. Evacuation port 50 is shown to enter end flange 12 approximately radially to lateral surface, 41, thereof, then turn into an approximately axial direction within end flange 12.

Smaller counterbores, 52a, in end cylinder 12, 52b, in first packing cup 16a, 52c, in second packing cup 16b, 52d, in third packing cup 16c, 52e, in fourth packing cup 16d, 52f, in return cup 18, and, 52g, in pressure breaker cup 20, confine packing material 24a-24g, respectively, forming thereby the necessary seals between the members and the shaft.

Lubrication ports, 53a-53c, in FIG. 1B provide lubrication to the shaft, the packing and to apparatus cooperating with stuffing box 10, such as a compressor, as an example. Port 53a may be an outer lubrication port, 53b may be an inner lubrication port, and port 53c may be a cylinder lubrication port, as examples. As will be described hereinbelow, inner and outer lubrication ports lubricate the rod and packing at inner and outer axial locations in the stuffing box, the lubricant being disposed between the outside diameter of the shaft and inside diameter of the packing. Cylinder lubrication typically introduces oil into the compressor cylinder out of the end of the collar of the packing box. Cylinders may have two packing boxes, one at each end. The cylinder lubrication would then be provided only by the outboard or top stuffing box since gravity will allow the lubricant exit the collar and enter the cylinder to lubricate the piston rings. If an inboard stuffing box is used the cylinder lubrication port is simply plugged or capped.

Figure 2A:
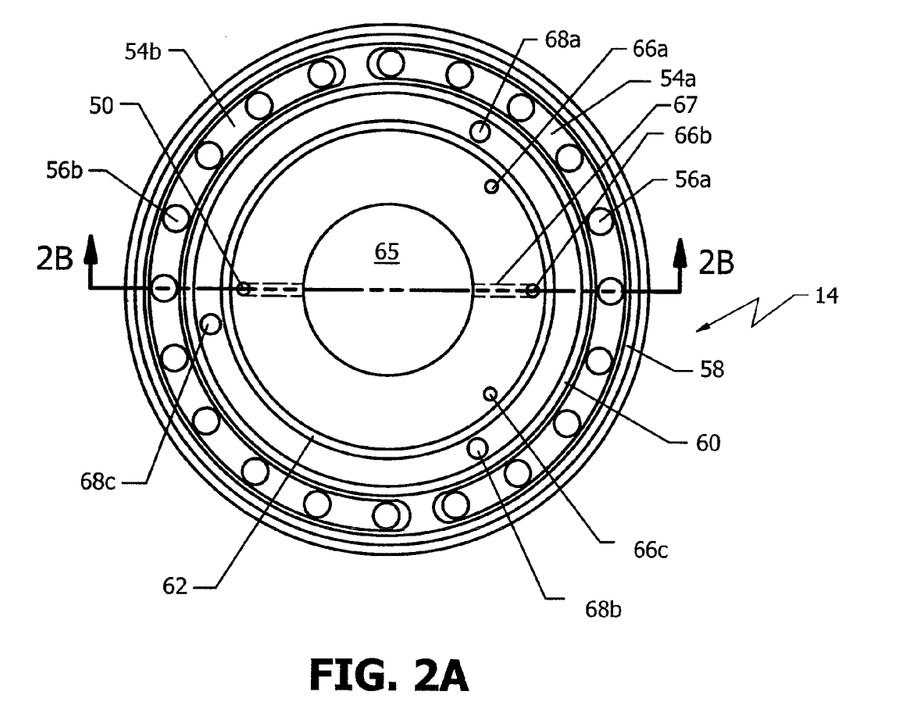

FIG. 2A is a schematic representation of the top view of vent disk 14 for directing fluids having passed through intervening packing material safely out of the stuffing box to where they may be collected, if required. Circular, non-intersecting coolant grooves, 54a, and 54b, therein, include at least one coolant port, 56a, and 56b, in each of the coolant grooves, respectively, which pass through the disk. Coolant inlet groove 54a receives coolant from axial coolant inlet port 36 of end flange 12, while exit coolant groove 54b is in fluid communication with axial coolant outlet port 38 of end flange 12. When the coolant enters the inlet groove or the outlet groove from the at least one inlet port or the at least one outlet port, respectively, the coolant fills the respective grooves, thereby increasing the efficiency of cooling. At least one coolant port 56a of vent disk 14 is in fluid communication with a coolant inlet groove of a first adjacent packing cup 16a, as will be described hereinbelow. Similarly, at least one coolant exit port 56b is in fluid communication with a coolant exit groove of adjacent packing cup 16a.

The diameter, width, and depth dimensions of these non-intersecting inlet and outlet cooling grooves, and those described hereinbelow, may be selected to achieve maximum cooling of the packing in the stuffing box member. Shapes other than circular grooves may be envisioned. The large amount of contact area between the coolant and the interior of the stuffing box close to the actual packing, and the large amount of flow area for the coolant decreases the pressure drop in the coolant across the stuffing box, thereby increasing the flow of coolant. The low-pressure drop may eliminate the need for a dedicated coolant pump, and allow a coolant pump on a compressor, as an example, to provide the coolant.

Figure 2B:
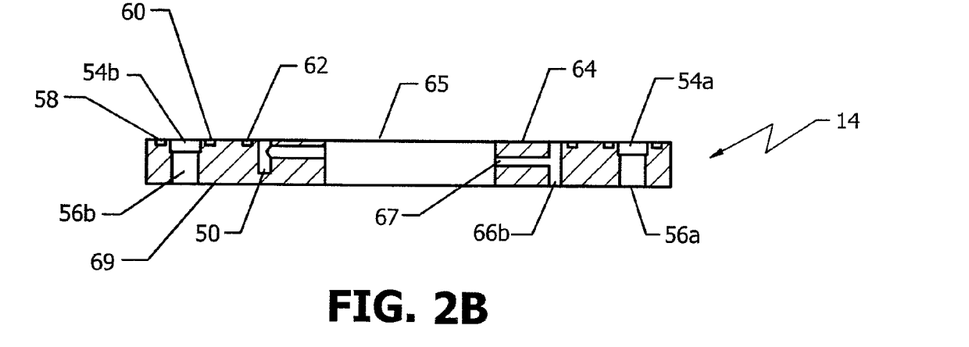
FIG. 2B is a schematic representation of the side view thereof.

O-ring grooves, 58, 60, and 62, with corresponding O-rings (not shown in the FIGURES) provide a fluid (liquid and gas) seal between first flat surface, 64, of disk 14 (FIG. 2B) and flat interior surface 47 of end flange 12 (FIG. 1A). Although O-ring seals are illustrated in FIGS. 2A and 2B and in the following description, there are other sealing means which may be effective for particular intended uses. Metal gaskets, and the use of carefully machined flat surfaces without gasketing materials, as examples, may also be employed.

Fluid vent 50, shown in FIG. 1A, hereof, is employed to remove fluids passing between the shaft and the packing materials. As shown in FIG. 1A, collection or pumping apparatus 30 may be used to collect and/or exhaust such fluids, if required.

FIG. 2B is a schematic representation of the side view of vent disk 14 illustrated in FIG. 2A hereof. In situations where there is little likelihood of fluids which must be removed collecting in bore 65, vent disk 14, smaller counterbore 52a and packing 24a in end flange 12 may be removed from the stuffing box.

Lubrication ports, 66a-66c, provide lubrication to the packing material, to the shaft, and may provide lubrication to the apparatus with which the stuffing box cooperates, such as a compressor, as discussed hereinabove. Bore 66b is shown as the bend of lubrication port 53a in FIG. 1B in the axial direction. Port, 67, branches from bore 66b and opens into bore 65 for lubricating the shaft (not shown in FIG. 2B), as an example. Alignment holes 68a-68c permit alignment of the members of the stuffing box, as mentioned hereinabove. Second, flat surface, 69, parallel to and opposing surface 64, is also shown.

Figure 3A:
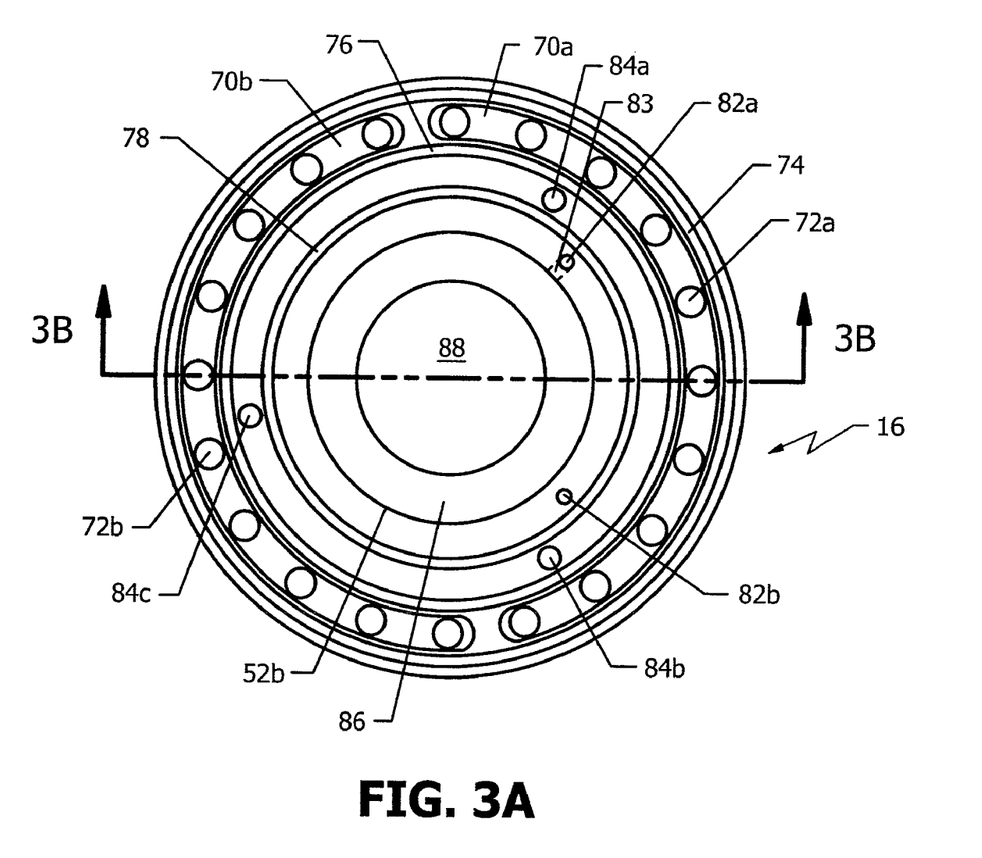

FIG. 3A is a schematic representation of the top view of typical packing cup member 16. Circular, non-intersecting coolant grooves, 70a, and 70b, therein, include at least one coolant port, 72a, and 72b, in each of the coolant grooves, respectively, which pass through packing cup 16. Coolant inlet groove 70a receives coolant from at least one coolant port 56a exiting disk 14, while exit coolant groove 70b is in fluid communication with coolant outlet port 56b of disk 14. At least one coolant port 72a of packing cup 16 is in fluid communication with a coolant inlet groove of an adjacent packing cup. Similarly, at least one coolant exit port 72b is in fluid communication with a coolant exit groove of an adjacent packing cup 16.

O-ring grooves, 74, 76, and 78, with corresponding O-rings (not shown in the FIGURES) provide a fluid (liquid and gas) seal between first flat surface, 80, of packing cup 16 (FIG. 3B) and second flat surface 69 of disk 14 (FIG. 2B).

Lubrication ports, 82a-82b, provide lubrication to the packing material, to the shaft, and may provide lubrication to the apparatus with which the stuffing box cooperates, such as a compressor, as discussed hereinabove. Bore 82a is shown as the continuation of lubrication bore 66b in FIG. 2B in the axial direction. Port, 83, branches from bore 82a and opens into counterbore 52b for lubricating the packing material 24b (not shown in FIG. 3A), as an example. Alignment holes 84a-84c permit alignment of the members of the stuffing box, as mentioned hereinabove.

Figure 3B:
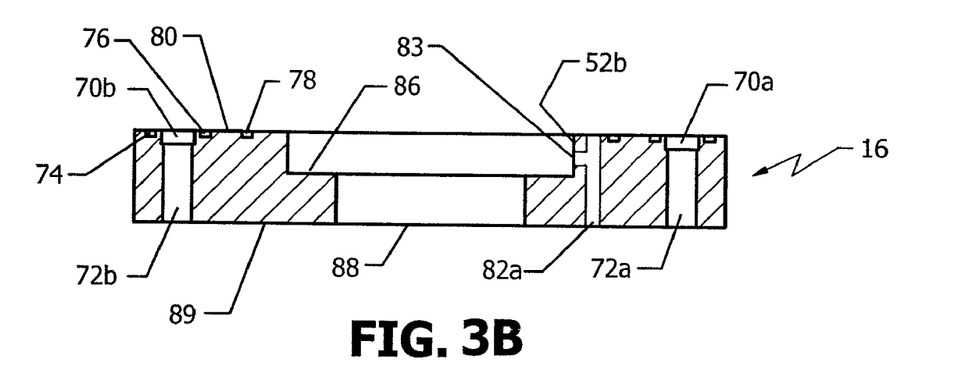
FIG. 3B is a schematic representation of the side view thereof.

FIG. 3B is a schematic representation of the side view of packing cup 16 illustrated in FIG. 3A hereof. Counterbore 52b having flat interior surface, 86, is adapted for holding packing material 24b (not shown in FIG. 3B) such that a seal is formed with the moving shaft (not shown in FIG. 3B) moving in bore, 88, and the packing material, flat surface 86 and second flat surface 69 of disk 14. Opposing, second flat surface, 89, to first surface 80 is shown.

Figure 4A:
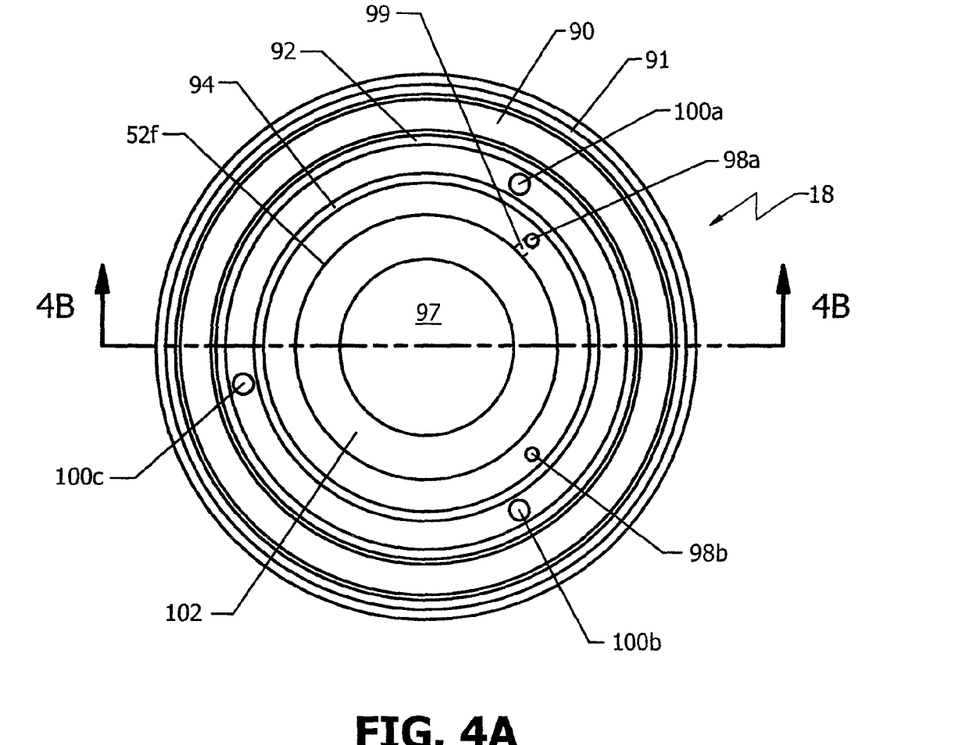

FIG. 4A is a schematic representation of the top view of coolant return cup, 18, illustrating circular groove, 90, for receiving coolant from at least one port 72a from an adjacent packing cup 16 shown in FIG. 3A, and returning the coolant to at least one coolant exit port 72b therein.

O-ring grooves, 91, 92, and 94, with corresponding O-rings (not shown in the FIGURES) provide a fluid (liquid and gas) seal between first flat surface, 96, of return cup 18 (FIG. 4B) and second flat surface 89 of packing cup 16 (FIG. 3B).

Lubrication ports, 98a and 98b, provide lubrication to the packing material, to the shaft, and may provide lubrication to the apparatus with which the stuffing box cooperates, such as a compressor, as discussed hereinabove. Bore 98a is shown as the continuation of lubrication bore 82a in FIG. 3B in the axial direction. Port, 99, branches from bore 98a and opens into counterbore 52b for lubricating packing material 24b (not shown in FIG. 4A), as an example. Alignment holes 100a-100c permit alignment of the members of the stuffing box, as mentioned hereinabove.

Figure 4B:
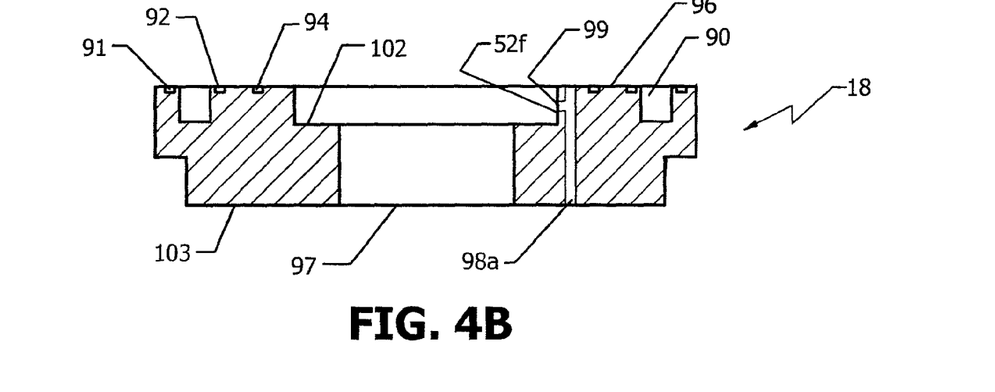
FIG. 4B is a schematic representation of the side view thereof.

FIG. 4B is a schematic representation of the side view of return cup 18 illustrated in FIG. 4A hereof. Counterbore 52f having flat interior surface, 102, is adapted for holding packing material 24f (not shown in FIG. 4B) such that a seal is formed with the moving shaft (not shown in FIG. 4B) moving in bore, 97, and the packing material, interior flat surface 102 and second flat surface 89 of packing cup 16. Opposing, second flat surface, 103, to first surface 96 is shown.

Figure 5A:
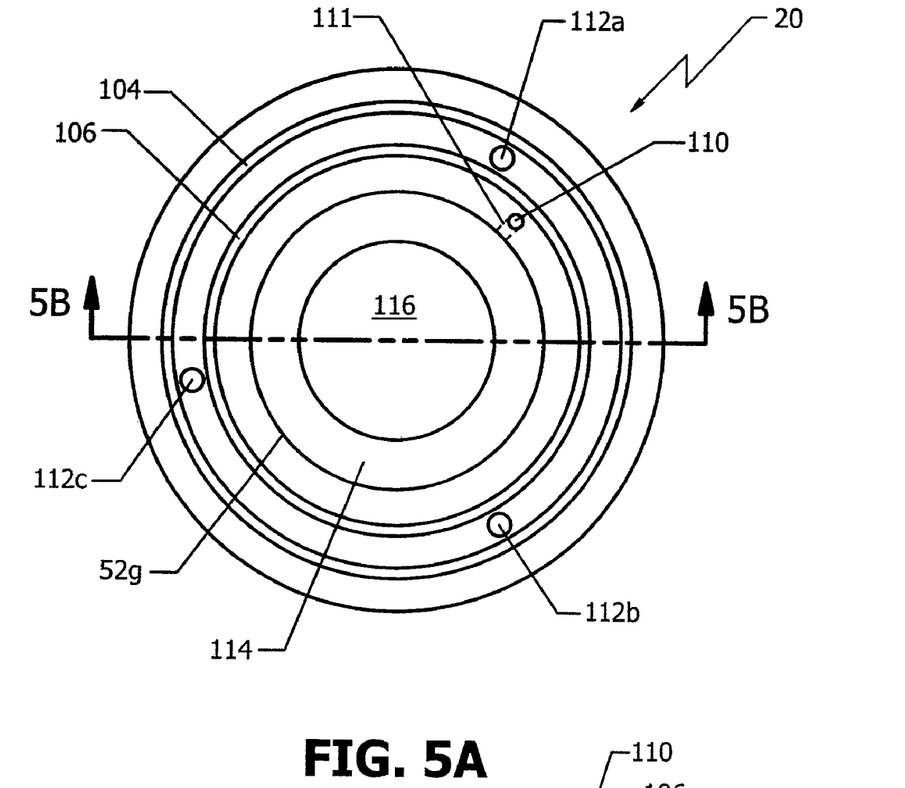

FIG. 5A is a schematic representation of the top view of pressure breaker cup, 20, for reducing pressure on packing material behind it. O-ring grooves, 104 and 106, with corresponding O-rings (not shown in the FIGURES) provide a fluid (liquid and gas) seal between first flat surface, 108, of pressure breaker 20 (FIG. 5B) and second flat surface 103 of return cup 18 (FIG. 4B).

Lubrication bore, 110, is shown as a continuation of lubrication bore 98a in FIG. 4B is shown as providing lubrication to the packing material through port, 111 (not shown in FIG. 5A), which opens into counterbore 52g, as an example. Alignment holes 112a-112c permit alignment of the members of the stuffing box, as mentioned hereinabove.

Figure 5B:
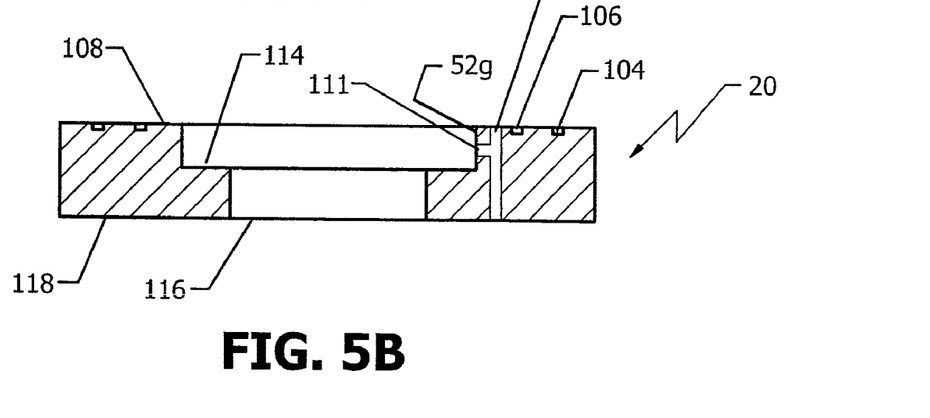
FIG. 5B is a schematic representation of the side view thereof.

FIG. 5B is a schematic representation of the side view of pressure breaker cup 20 illustrated in FIG. 5A hereof. Counterbore 52g having flat interior surface, 114, is adapted for holding packing material 24g (not shown in FIG. 5B) such that a seal is formed with the moving shaft (not shown in FIG. 4B) moving in bore, 109, and the packing material, interior flat surface 114 and second flat surface 103 of return cup 18. Opposing, second flat surface, 118, to first surface 108 is shown.

Figure 6A:
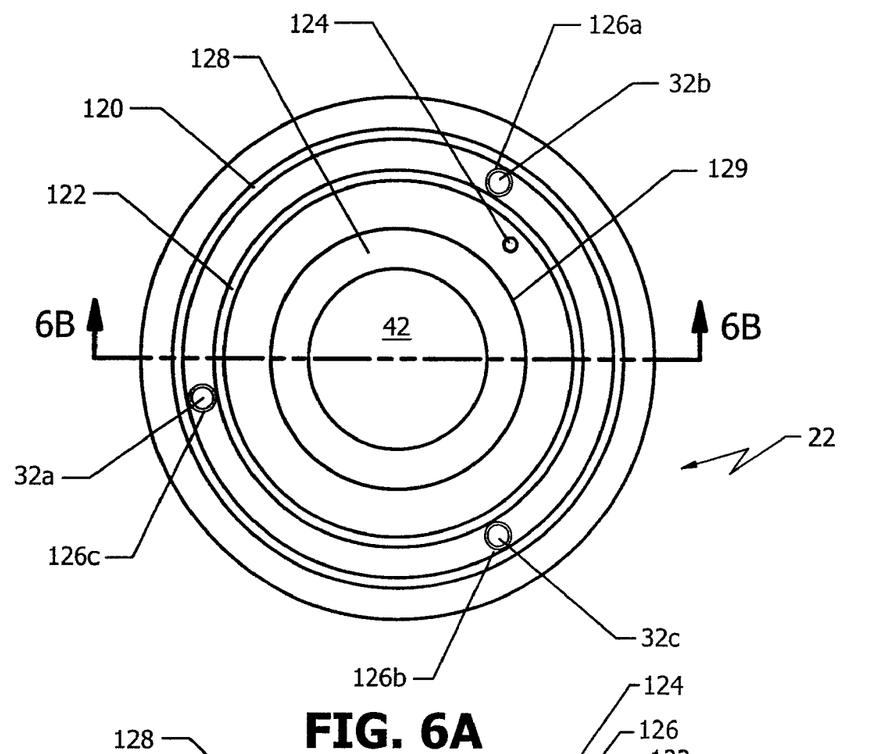

FIG. 6A is a schematic representation of the top view of collar 22 for sealing the stuffing box members to a cooperating device, such as a compressor cylinder, and for aligning the bores of the members to the shaft emerging from the device. O-ring grooves, 120 and 122, with corresponding O-rings (not shown in the FIGURES) provide a fluid (liquid and gas) seal between first flat surface, 126, of collar 22 (FIG. 6B) and second flat surface 118 of pressure breaker cup 20 (FIG. 5B).

Lubrication port, 124, receives lubricant from lubrication port 110 in pressure breaker cup 20, and directs it through port 125 which opens through the wall of collar 22 into an apparatus cooperating with stuffing box 10 (not shown in FIG. 6A). It should be mentioned that although the lubrication ports shown in FIGS. 1A, 1B, 2A, 2B, 3A, 3B, 4A, 4B, 5A, 5B, 6A, and 6B have been shown as being connected to port 53a in FIG. 1B, other lubrication bores may derive from ports 53b and 53c of FIG. 1B. Further, the lubrication of the packing or the shaft shown in various of these FIGURES is arbitrary, and both the packing and the shaft, or one or the other, may be lubricated in a particular stuffing box member from different bores. Alignment holes 126a-126c permit alignment of the members of the stuffing box using alignment rods 32a-32c, as mentioned hereinabove.

Figure 6B:
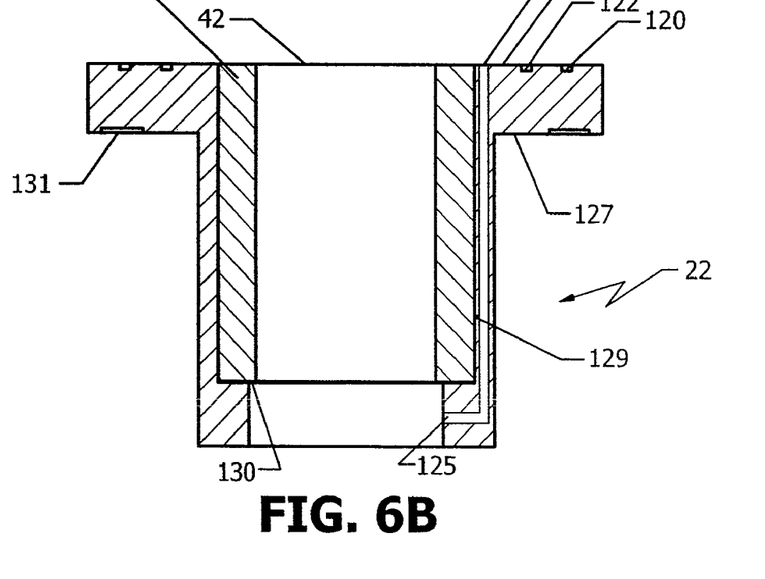
FIG. 6B is a schematic representation of the side view thereof.

FIG. 6B is a schematic representation of the side view of collar 22 illustrated in FIG. 6A hereof. Opposing, parallel second flat surface, 127, to first surface 126 is shown. Shown also is throat bushing insert, 128, inserted into bore, 129, in collar 22 and captured by lip, 130, therein, for stabilizing the shaft (not shown in FIG. 6B) and assist in keeping the shaft traveling straight in the stuffing box and cooperating cylinder apparatus. The insert may be bronze other suitable material. Circular groove, 131, permits use of a metal gasket (not shown in FIG. 6B) to seal second flat surface 127 to a cooperating apparatus. This gasket may be brass, as an example.

Figure 7:
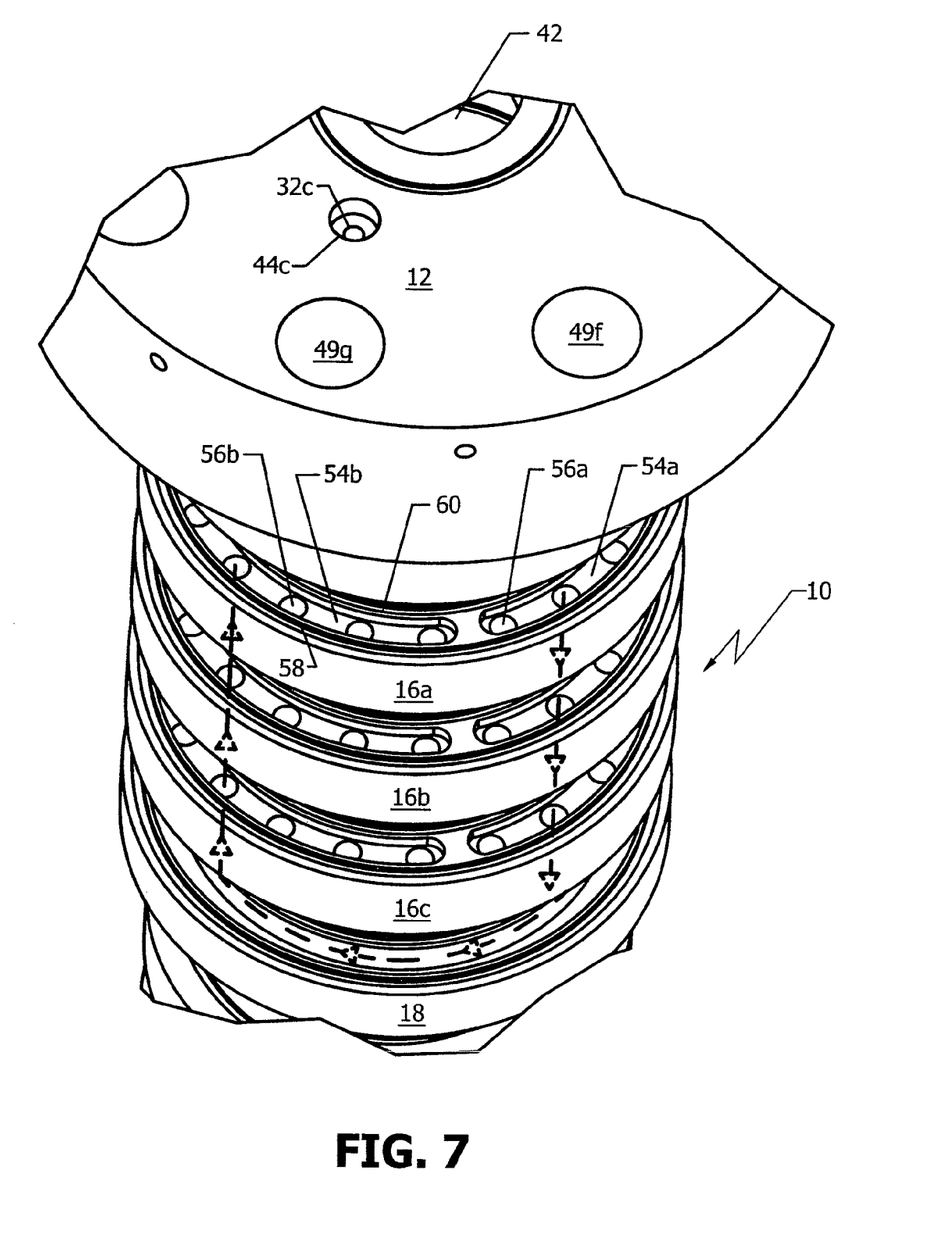
FIG. 7 is a schematic representation of a projection view of a cutaway stuffing box assembly illustrating the end flange, coolant flowing into the non-intersecting grooves and out through the coolant ports of the packing cups, and being returned by the coolant return cup to the coolant return ports of the packing cups.

FIG. 7 is a schematic representation of a projection view of a cutaway of stuffing box 10 illustrating end flange 12, coolant flowing into non-intersecting grooves 54a and out through at least one coolant port 56a of packing cups 16, and being returned by coolant return cup 18 to at least one coolant return port 56b into return groove 54b of packing cups 16.

Figure 8:
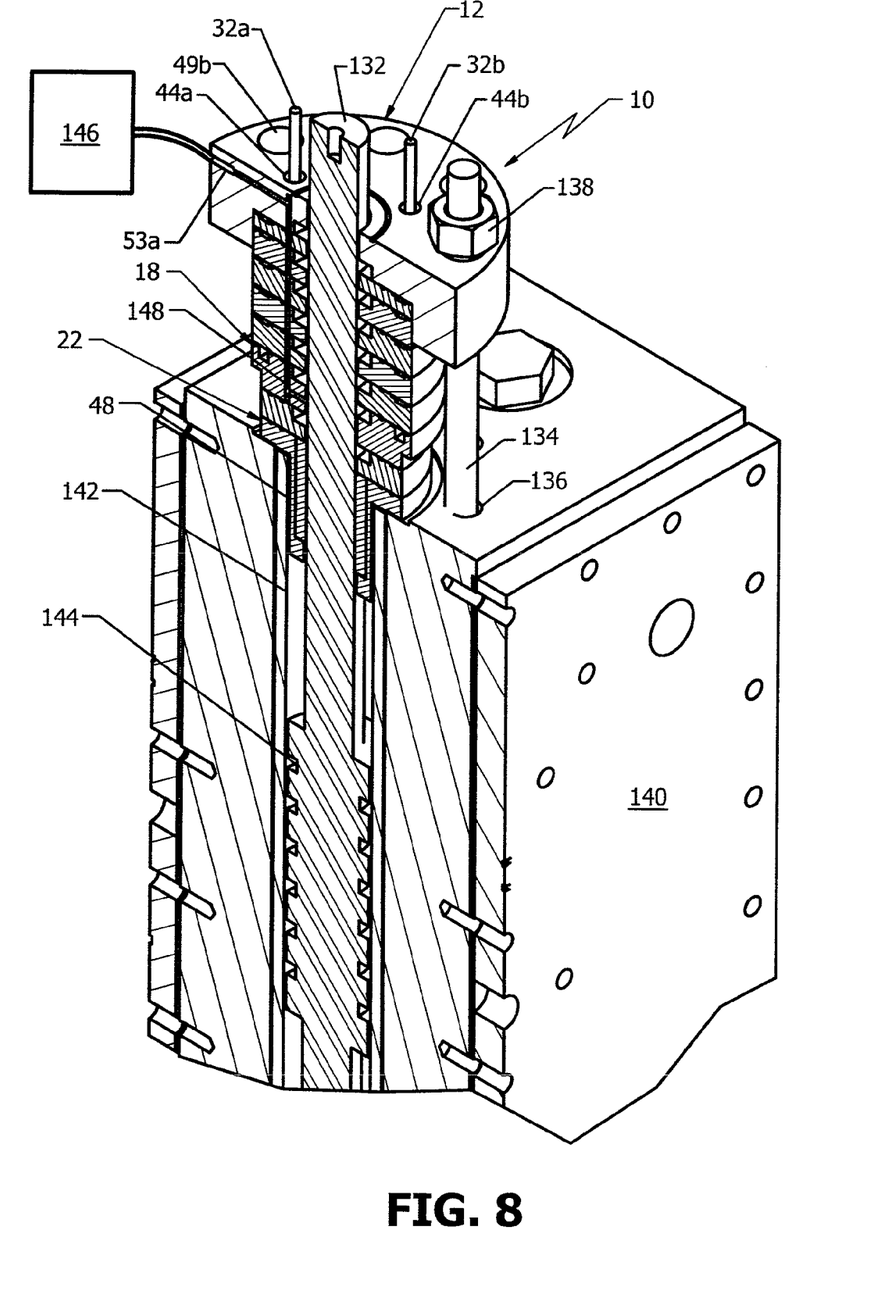
FIG. 8 is a schematic representation of a cutaway projection view of the stuffing box hereof, showing the piston shaft, collar, alignment bolts and attachment nuts, and illustrating cooperation thereof with the cylinder housing of a compressor.

FIG. 8 is a schematic representation of a cutaway projection view of stuffing box 10 hereof, showing shaft, 132, collar 22 alignment bolts, 134, shown as threaded rod screwed into threaded holes, 136, and attachment nuts, 138, and illustrating cooperation thereof with cylinder housing, 140, of a compressor. Shown is elongated portion 48 of collar 22 aligning stuffing box 10 with bore, 142, of compressor housing 140. Grooves, 144, for piston rings (not shown in FIG. 8) in bore 142 are also shown. Lubricant pump, 146, may be used to supply lubricant through port 53a through matching ports in each of the members of packing box 10 to shaft 132 at the region of coolant return cup 18. Clearly, there are many ways in which to drive shaft 132 (not shown in the FIGURES) depending on the intended application.

Figure 9:
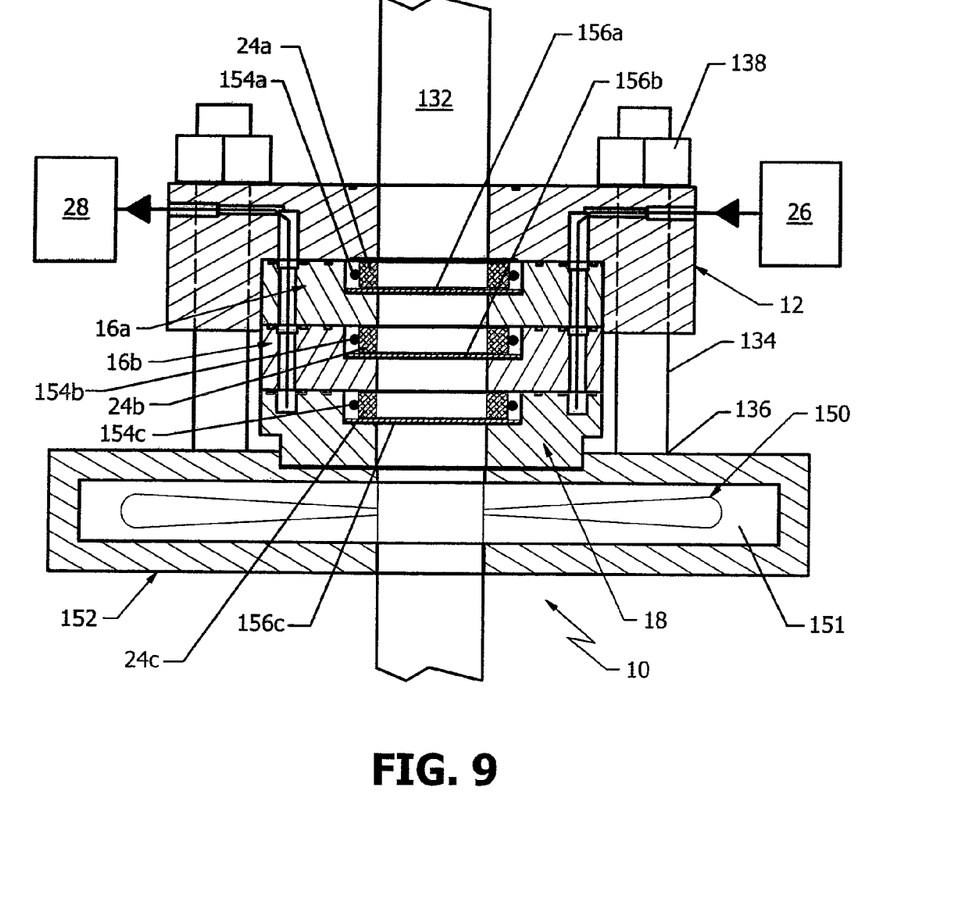
FIG. 9 is a schematic representation of a side view of a rotating shaft embodiment of the cooled stuffing box hereof showing the shaft and packing material, and illustrating the cooperation of the stuffing box with an impeller in a pump.

FIG. 9 is a schematic representation of a side view of a rotating shaft embodiment of cooled stuffing box 10, hereof, showing shaft 132 and packing material 24a-24c, and illustrating the cooperation of stuffing box 10 with impeller 150 operating within fluid-filled volume 151 of pump 152. Since shaft 132 is rotating instead of moving axially, the fluids escaping between the shaft and the packing material is significantly reduced, as is the need for lubrication. Shown also are garter springs, 154a-154c, and coil or plate springs, 156a-156c, for holding packing material 24a-24c, respectively. Alignment holes and alignment rods (not shown in FIG. 9), as described hereinabove, may be used to align the elements of stuffing box 10. Further, lubrication ports and gas vents (not shown in FIG. 9), as described hereinabove, may be included in this embodiment, if desired.

Garter springs are often used with reciprocating packing as well since they may assist in holding the packing in contact with the shaft so that the pressure forces can affect only the outside diameter of the packing, thereby forcing the packing against the shaft. In the absence of such containment, air/gas might pass between the shaft and the packing. That is, the spring establishes contact, while the pressure forces compress the packing since the area on the outside diameter of the packing is greater than the area on the inside diameter, and a net force or compression is generated. Generally, garter springs are part of commercially available packing. The garter springs operate in the same manner in the rotating configuration.

For reciprocating embodiments, during the compression stroke, as the piston moves toward the packing box it drags the packing against the face of the next outward cup (toward the piston defined as inward) where it is most needed since the pressure is greatest. When the piston is moving away from the packing box, the rod will drag the packing against the small flat surface created by the counterbore, which is a less effective sealing surface. However, this seal may be adequate as long as there is positive pressure in the cylinder. By contrast, some compressors pull a vacuum, which reverses the sealing properties of the cups, and might dictate reversing the cups. The dragging motion, then, establishes the surface contact, while the pressure forces provide the seal.

For rotating seals, coil springs may be used to provide a mechanical seal, since the motion which establishes contact is absent, and mechanical forces are primarily responsible for the seal. There may also be assistance from the pressure in the medium being pumped, but for low-pressure applications, if it is desirable to prevent the fluid from contacting the springs, the cups might be reversed. The configuration illustrated in FIG. 9 may be used for an electrically driven water pump, as an example, generally with two sliding smooth carbon (or plastic) faces at the point of contact.

In summary, embodiments of the apparatus hereof may operate as follows. Coolant flows into the stuffing box through an inlet port. The coolant is then channeled into a multiplicity of parallel ports, which are directed axially down the length of the stuffing box, by using circular interior grooves in the elements of the stuffing box. When the coolant reaches the last packing cup requiring cooling, the coolant is channeled to another multiplicity of parallel ports through which it passes back the axial length of the packing box. As illustrated in FIGS. 1A and 1B, one set of ports is on one side of the box, and the other is on the other side. If the diameter of the stuffing box were sufficiently large, an alternative apparatus might have incoming and outgoing ports placed at different radial distances from the central axis of the stuffing box. The incoming and outgoing coolant ports are connected in the final, cooled packing cup. The area of contact between the coolant and each packing cup is increased by including grooves that connect all of the ports common to one direction of coolant flow.

If required, ports are provided through which oil, water or other lubricant is injected to lubricate the rod and packing, and/or the compressor cylinder and piston rings. Additionally, a vent or vents may be included to capture and vent any air/gas or other fluid that leak passed the packing. Generally, this vent may be located before the last piece of packing through which the fluid would have to leak through prior to escaping into the atmosphere. In some embodiments, all of the packing cups are cooled, some may hold "pressure breakers" which restrict the flow of escaping gas without tightly contacting the shaft. In addition, the throat bushing disposed in the collar hereof for providing guidance for a compressor shaft without sealing or compressing the shaft in the event that it reciprocates slightly off-center, may not be necessary.

In other embodiments, lubrication ports for the inner and outer packing and compressor shaft, and the cylinder lubrication port are not employed.

Having generally described the invention, the following EXAMPLE provides additional details:

Example

Comparison of the cooling for stuffing boxes of embodiments of the present invention with other stuffing boxes is provided in the TABLE.

TABLE

| Test number | Stuffing Box Tested | Temperature of Coolant, ° F. | Temperature of Packing Box, ° F. | Temperature Difference |
|---|---|---|---|---|
| 1 | Non-Water Cooled | 165 | 220 | 55 |
| 2 | Single Internal Port | 165 | 200 | 35 |
| 3 | External Jacket | 67 | 107 | 40 |
| 4 | Parallel Ports (Present Apparatus) | 67 | 71 | 4 |
| 5 | Parallel Ports (Present apparatus) | 167 | 187 | 20 |

The tests using the non-water-cooled stuffing box (1) and the single cooled internal port (2) were simultaneously conducted using the same apparatus having both systems installed in it. The tests where an external jacket was cooled (3) and multiple parallel internal ports in accordance with embodiments of the present invention (4) were again simultaneously conducted using the same apparatus having both systems installed in it. Different apparatus employed coolant from different sources which gave rise to different coolant temperatures; the non-water-cooled stuffing box (1), the single external port cooled stuffing box (2) and the multiple-parallel port (5) used similar coolant sources.

Clearly, tests using the multiple parallel port stuffing box embodiments of the present invention [(4) and (5)] have significantly smaller temperature difference between the stuffing box temperature and the temperature of the provided coolant.

The foregoing description of the invention has been presented for purposes of illustration and description and is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. Apparatus for cooling reciprocating shaft packing material comprising:
    an end flange having:
    a cylindrical bore having a first diameter and defining an axis, a first circular counterbore through a first surface having a second diameter larger than the first diameter and centered on the axis forming a first interior flat surface,
    at least two first initially radial coolant ports opening to a lateral surface of said flange between the first surface and a second surface at one end and opening into the first interior surface at a second end;
    at least one cylindrical packing cup having an outer diameter adapted to be inserted into the first counterbore of said flange, and having a first flat surface and a second flat surface parallel thereto, a cylindrical bore having a diameter equal to the first diameter and centered on the axis, a circular counterbore through the first surface having a diameter equal to the second diameter and centered on the axis forming an interior flat surface, a first groove in the first surface disposed outside of the second diameter, a second groove in the first surface disposed outside of the second diameter and not intersecting the first groove, at least two axial coolant ports at least one of which is in fluid communication with the first groove at one end and opens into the second surface at the other end, and at least one of the at least two coolant ports is in fluid communication with the second groove at one end and opens into the second surface at the other end, at least one of the at least two cooling ports of said end flange being in fluid communication with the first groove, and at least one of the at least two cooling ports thereof being in fluid communication with the second groove;

a coolant return cup having first flat surface and a second flat surface parallel thereto, a cylindrical bore having a diameter equal to the first diameter and centered on the axis, a circular counterbore through the first surface disposed outside of the second diameter and centered on the axis forming an interior flat surface, a groove in the first side disposed outside of the second diameter, the at least two coolant ports exiting the second side of said at least one packing cup being in fluid communication with the groove;

said flange having a chosen number of alignment holes disposed axially around the axis connecting the first surface and the second surface, wherein said at least one packing cup has a chosen number of alignment holes disposed axially around the axis connecting the first surface and the second surface and adapted to align with the alignment holes in said flange, and wherein said coolant return cup has a chosen number of alignment holes disposed axially around the axis connecting the first surface and the second surface and adapted to align with the alignment holes in said flange;

means for sealing said coolant return cup against the second side of said at least one packing cup;

a shaft adapted to slidably move within the bores of said flange, said at least one packing cup, and said coolant return cup; packing material disposed within the circular counterbore of said at least one packing cup and the circular counterbore of said coolant return cup; and means for moving coolant fluid through the cooling ports of said flange, said at least one packing cup, and said coolant return cup.

2. The apparatus of claim 1, further comprising a collar having a first flat side and a second flat side parallel thereto, a cylindrical bore therethrough having a diameter equal to the first diameter and centered on the axis, having a cylindrical guide portion extending from the first side, and a chosen number of alignment holes disposed axially around the axis connecting the first surface and the second surface and adapted to align with the alignment holes in said coolant return cup.

3. The apparatus of claim 2, further comprising a cylinder body adapted for receiving the cylindrical guide portion of said collar and said shaft, and having a chosen number of threaded bolt holes therein having the same pattern as the bolt holes axially disposed through said end flange, for attaching said end flange to said cylinder body.

4. The apparatus of claim 1, further comprising alignment rods adapted for aligning the alignment holes of said end flange, said at least one packing cup, said coolant return cup and said collar.

5. The apparatus of claim 1, further comprising refrigeration apparatus for chilling the coolant.

6. The apparatus of claim 1, further comprising a pump for lubrication fluids, and wherein said end flange has at least one radial lubrication port opening to the outside of said flange at one end and opening into said at least one packing cup.

7. The apparatus of claim 1, wherein said end flange has a second circular counterbore having a third diameter smaller than the diameter of the first circular counterbore and centered on the axis forming a second interior flat surface; said apparatus further comprising: a cylindrical plate disposed in the first counterbore between said end flange and said at least one packing cup, having a first flat surface, a second flat surface parallel thereto, and a lateral surface therebetween, a cylindrical bore having a diameter equal to the first diameter and centered on the axis, a chosen number of alignment holes disposed axially around the axis connecting the first surface and the second surface aligned with the alignment holes of said end flange, a first groove in the first surface disposed outside of the second diameter, a second groove in the first surface disposed outside of the second diameter and not intersecting the first groove, at least two axial coolant ports at least one of which is in fluid communication with the first groove at one end and opens into the second surface at the other end, and at least one of the at least two coolant ports is in fluid communication with the second groove at one end and opens into the second surface at the other end, at least one of the at least two cooling ports of said end flange being in fluid communication with the first groove, and at least one of the at least two cooling ports being in fluid communication with the second groove, at least one vent port opening into the cylindrical bore of said plate at one end, and opening into the first surface at the other end, and wherein said end flange has at least one vent port opening at the lateral portion thereof at one end, and opening into the first interior surface of said flange in the first counterbore such that the at least one vent port of said end flange is in fluid communication with the at least one vent port of said cylindrical plate, thereby permitting fluids to be collected from the vicinity of said shaft.

8. The apparatus of claim 7, further comprising a collection apparatus for collecting fluids flowing passed said packing material.

9. The apparatus of claim 1, further comprising: a cylindrical pressure breaker having a first flat surface and a second flat surface parallel thereto, a cylindrical bore having a diameter equal to the first diameter and centered on the axis, a circular counterbore through the first surface having a diameter equal to the second diameter and centered on the axis forming an interior flat surface, a chosen number of alignment holes disposed axially around the axis connecting the first surface and the second surface and adapted to align with the alignment holes in said coolant return cup; and packing material disposed in the counterbore.

10. The apparatus of claim 1, further comprising means for supplying chilled coolant to the at least one first groove.

* * * * *